Nov. 14, 1967 G. E. KELLOGG 3,352,315
MANUAL AND POWER CONTROL MECHANISM AND METHOD
Filed Oct. 14, 1964
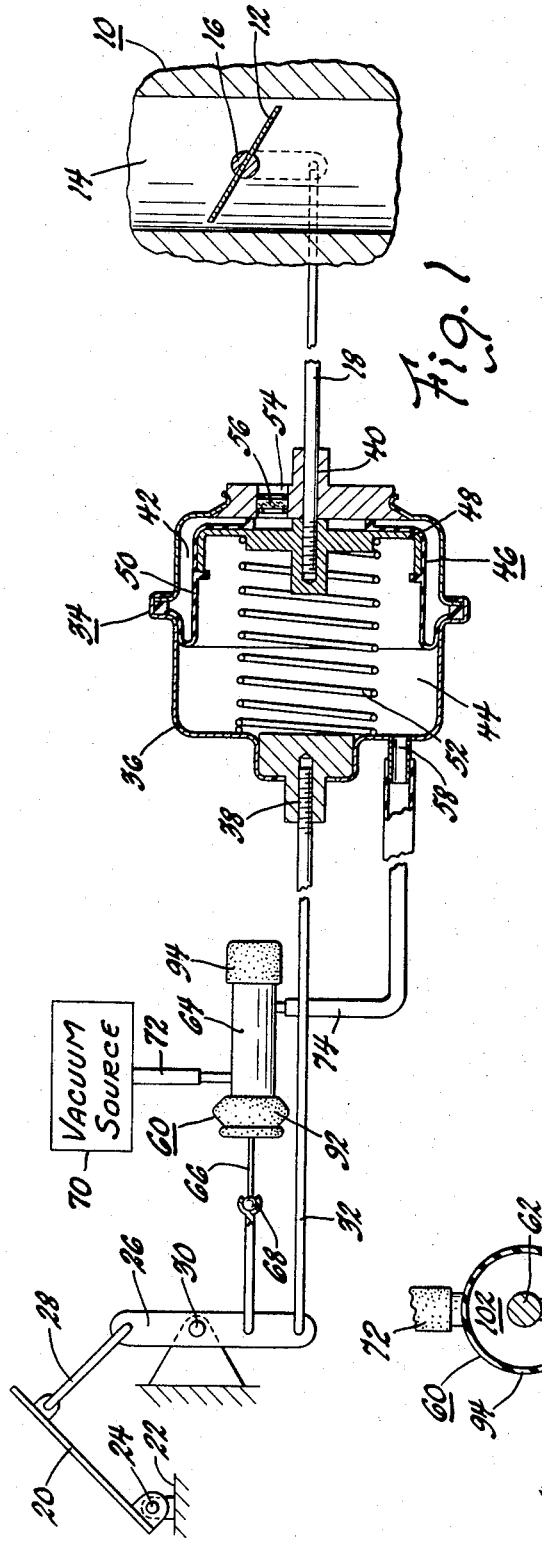
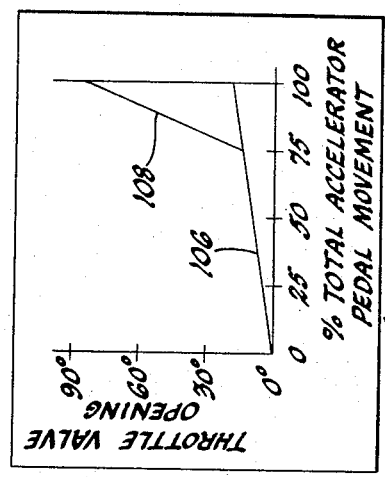
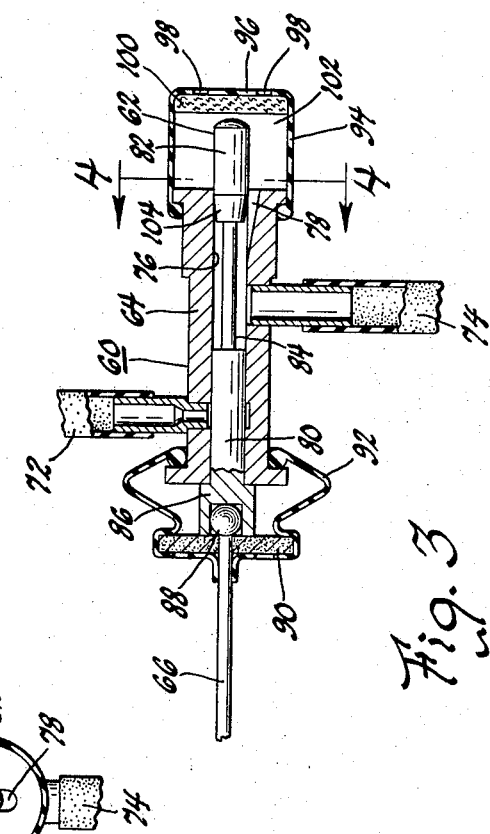
INVENTOR.
George E. Kellogg
BY
O. D. McGraw
HIS ATTORNEY

United States Patent Office 3,352,315
Patented Nov. 14, 1967

3,352,315
MANUAL AND POWER CONTROL MECHANISM AND METHOD
George E. Kellogg, Miamisburg, Ohio, assignor to General Motors Corporation, Detroit, Mich., a corporation of Delaware
Filed Oct. 14, 1964, Ser. No. 403,743
8 Claims. (Cl. 137—1)

The invention relates to a control mechanism which has a manual movement nad a powered movement superimposed on a portion of the manual movement, with the amount of powered movement being related to the amount of manual movement. The control mechanism is particularly useful in automotive vehicles as a control linkage for the engine throttle valve. When so utilized, the system permits the use of a low accelerator pedal at the zero throttle position. Such a pedal position is desirable when using a brake system having a low brake pedal position. The two pedals can then be positioned at approximately the same height so that the vehicle operator is not required to raise his foot to a considerable extent when shifting from one pedal to the other.

Linkage embodying the invention includes a power servo suspended in a link connecting the accelerator pedal and the carburetor containing the throttle valve. The servomotor is preferably of the vacuum actuated type so that a readily available source of power such as the engine intake manifold vacuum is utilized. The system includes a vacuum control valve assembly which is operated by the accelerator pedal after the pedal has manually opened the throttle valve to some extent. The valve assembly then controllably admits vacuum to the servomotor in relation to additional accelerator pedal movement to change the effective length of the link in which the servomotor is suspended so as to open the throttle valve the desired amount with relatively little additional manual movement of the accelerator pedal. The arrangement is preferably such that the system utilizes a major portion of the available manual travel of the accelerator pedal while obtaining the first 10° to 15° throttle valve opening. Then, by use of the servomotor and control valve assembly, the remaining 60° to 70° throttle valve opening is obtained by a minor portion of the total available accelerator pedal travel. If, for example, one inch of total accelerator pedal travel is available, the manual portion of throttle valve opening movement would be approximately ¾", and the manual and servomotor combined movement would be approximately ¼". Depending upon the arrangement of the linkage, the servomotor may shorten the rod in which it is suspended or may lengthen the rod so as to acquire the desired superimposed throttle opening movement.

In the drawing:

FIGURE 1 is a schematic representation of a system embodying the invention, wtih parts broken away and in section.

FIGURE 2 is a curve showing one method of operation of the system.

FIGURE 3 is a cross section view of the control valve assembly contained in the system illustrated in FIGURE 1.

FIGURE 4 is a cross section view of the control valve assembly taken in the direction of arrows 4—4 of FIGURE 3.

The automotive vehicle in which the system of FIGURE 1 is installed is provided with a carburetor 10 for the engine, with throttle valve 12 positioned in the fuel-air passage 14 of the carburetor. As is well known in the art, valve 12 pivots about the axis of valve shaft 16 to control the engine of which the carburetor is a part. Movement of the valve 12 is accomplished through a rod 18 attached to the valve shaft 16 by a suitable lever arrangement so that axial movement of rod 18 results in pivotal movement of valve 12.

The vehicle is provided with an accelerator pedal 20 suitably mounted to a portion 22 of the vehicle so as to be pivoted at 24 by the operator's foot. Pivotal movement of pedal 20 moves link 26 through rod 28 abutting pivot 30, also attached to the vehicle. A push rod or link 32 is pivotally attached to link 26 so as to be moved substantially axially by pivotal movement of pedal 20. A servomotor 34 is suspended in the link formed by rods 32 and 18. Servomotor 34 is a power cylinder having a housing 36 secured at 38 to rod 32 and sldiable at 40 on rod 18. Thus rods 32 and 18 are in axial alignment. Housing 36 is divided into a constant pressure chamber 42 and a variable pressure chamber 44 by the power wall 46. Power wall 46 is reciprocably movable in housing 36 and is illustrated as a piston 48 and a rolling diaphragm 50. A compression spring 52 in chamber 44 abuts at one end against housing 36 and at the other end against piston 48 so that power wall 46 and rod 18 are yieldingly held away from the end of housing 36 to which rod 32 is secured. The housing is provided with a suitable air inlet 54 containing a filter 56 so that atmospheric pressure is provided in chamber 42. A variable pressure inlet 58 is provided in housing 36 for chamber 44.

A control valve assembly 60 is suitably mounted to a portion of the vehicle and contains a reciprocably movable valve 62 in the valve body 64 of the assembly. A valve control rod 66 is pivotally attached to link 26 and contains a ball joint 68 so that the pivotal movement of link 26 is conducted through valve 62 as linear movement through rod 66. A vacuum source 70, which may be the engine intake manifold, is connected by conduit 72 to the valve assembly 60. A conduit 74 connects the valve assembly 60 with the inlet 58 of the servomotor 34.

The valve assembly 60 is illustrated in detail in FIGURES 3 and 4. The valve body 64 has a bore 76 extending therethrough, with one end being provided with a tapered slot 78. Conduits 72 and 74 connect with bore 76 at axially spaced positions along the bore, with conduit 74 being connected near but not extending into slot 78. Valve 62 is reciprocably received in bore 76 and includes a land 80 at one end and a land 82 at the other end. The lands are separated by a valve groove 84. Land 80 is provided with an enlarged recessed outer head 86 in which the ball end 88 of rod 66 is received and secured in place by a filter plate 90. A flexible boot 92 seals about rod 66 and one end of the valve body 64 so that it encloses valve end 86, rod ball end 88, and filter plate 90. A cap 94 is sealingly secured about the other end of valve body 64 with the cap end 96 being spaced away from the valve body so as to permit movement of the valve land 82 outwardly of bore 76. Cap end 96 is provided with suitable openings 98 and an air filter 100 so that the chamber 102 formed by the cap and the valve body end is open to atmospheric pressure at all times. The open end of tapered slot 78 is connected with chamber 102. The valve land 82 has an inner tapered land section 104 which, in the zero throttle pedal position illustrated, is adjacent slot 78 with only a minor portion of the full diameter of land 82 engaging the wall of bore 76 to guide the valve. Conduit 74 opens into the annular space provided by valve groove 84 between lands 80 and 82. Land 80 is positioned to close off conduit 72 in the zero throttle pedal position. Thus the reduced air pressure from vacuum source 70 is disconnected from conduit 74 and servomotor 34.

The vehicle operator controls power of the engine and vehicle speed by actuating the accelerator pedal 20. When he presses downwardly on pedal 20 to pivot the pedal about the pivot 24, push rod 28 pivots link 26 in a clockwise direction about its pivot 30. This results in leftward movement of rod 32 and valve rod 66. Since the servomotor 34 has its housing secured to rod 32, it also moves leftwardly. Conduit 74 is a flexible conduit to permit the necessary movement of the servomotor. With no vacuum being supplied to servomotor chamber 44, the chamber is at atmospheric pressure and the power wall 46 is fully extended to the right by spring 52. Thus the leftward movement of the housing 36 carries the spring 52 and the piston wall 46 and moves rod 18 leftwardly with it to open the throttle valve 12. The linkage is preferably so arranged that approximately ¾ of the throttle assembly accelerator pedal movement will result in a 10° to 15° throttle opening due only to manual operation of the system. During this portion of accelerator pedal movement toward the throttle opening position, valve 62 is being moved leftwardly as seen in FIGURE 3. Land 82, including its tapered section 104, is being moved to gradually close slot 78. When the throttle has been opened the approximate 10° to 15°, land 80 of valve 62 has moved leftwardly to open conduit 72 to the chamber formed by the valve groove 84, thus placing conduits 72 and 74 in fluid communication. Tapered slot 78 has been sufficiently closed by land 82 so as to restrict the entry of atmospheric air to some extent and, therefore, to establish a slightly reduced pressure in conduit 74 and variable pressure chamber 44. At this time the servo becomes operable. Further throttle opening movement of accelerator pedal 20 will cause slightly additional manually actuated opening movement. Concurrently, slot 78 will be further closed by land 82, thus further increasing the vacuum being transmitted to chamber 44. The differential pressure acting on power wall 46 will move the power wall to the left in housing 36, contributing additional throttle opening movement to rod 18 in relation to the throttle opening movement of rod 32. Thus the movement of the power wall 46 is superimposed on the manual movement of the linkage arrangement. If the accelerator pedal is moved farther in the throttle opening direction, the vacuum in variable pressure chamber 44 increases further, resulting in further leftward movement of power wall 46 until the accelerator pedal in its full throttle open position has actuated valve assembly 60 and rod 32 to move the throttle valve to the substantially full open position. Release of the accelerator pedal 20 results in a similar reverse operation.

The operation is shown by the curves of FIGURE 2. The curves are plotted with a percentage of total accelerator pedal movement as the abscissa and the degree of total valve opening as the ordinate. Curve 106 illustrates the amount of throttle opening due to manual operation of the system. It is noted that at approximately ¾ of the accelerator pedal movement the throttle valve opening is approximately 15°. At this point the servomotor 34 is energized in accordance with additional accelerator pedal movement and curve 108 represents the amount of throttle valve opening obtained by means of the servomotor and manual operation combined. It is desirable to utilize the major portion of the accelerator pedal movement for manual operation only, with only a minor portion of the movement being utilized for servomotor operations. Similarly, it is desirable to have the manual operation of the system move the throttle valve through only a minor portion of total throttle valve opening, with the servomotor operation combined with manual operation arranged to provide a major portion of the throttle valve opening movement. Thus the system is operated by providing a manual input and output to open the throttle valve slightly while utilizing a majority of the manual input movement capability and changing the ratio of output movement by use of the servomotor during a minor portion of input movement. Considering the rod 18 to be an output member and the rod 32 to be an input member, their ratio of movement is 1:1 during manual operation alone but is increased so that the output member moves at a greater ratio when the servomotor is operating. The system does not require the specific linkage arrangement illustrated, and in some adaptations of the system the actuation of the servomotor 34 may lengthen the effective length of the actuating link composed of rods 32 and 18 and the servomotor instead of shortening it, to the same effect. Sources of power other than vacuum may also be utilized without departing from the scope of the invention.

What is claimed is:

1. A method of controlling a member by movement of an output portion of a force-transmitting linkage also having an input portion and a ratio changing portion, comprising the steps of moving the input portion to transmit a force in a 1:1 ratio to the output portion through the ratio changing portion throughout the range of linkage movement and actuating the ratio changing portion in response to movement of the input portion in only a minor part of the range of linkage movement to superimpose a force ratio other than 1:1 and move the output portion at a ratio other than 1:1 only in the minor part of the range of linkage movement.

2. The method of claim 1, further comprising the steps of moving a control member by the input portion to an operative position and controlling the extent of actuation of the ratio changing portion by further movement of the control member by movement of the input portion only during the minor part of the range of linkage movement.

3. A throttle valve control system comprising
an accelerator pedal,
a throttle valve,
link means connected with said accelerator pedal and said throttle valve and movable by said accelerator pedal throughout the entire range of accelerator pedal movement and when so moved moving the throttle valve at a first rate of movement in relation to movement of said accelerator pedal,
and link means moving means connected with and forming a part of said link means and having control means operatively sensing the movement of said accelerator pedal causing said first rate of movement of said throttle valve,
said link means moving means being actuated under control of said control means and only in a minor portion of the entire range of movement of said accelerator pedal and when so actuated moving said link means and therefore moving said throttle valve at a second rate of movement superimposed on said first rate of throttle valve movement in relation to movement of said accelerator pedal.

4. The throttle valve control system of claim 3, said link means moving means including a servomotor moving with said link means at the first rate of movement.

5. The throttle valve control system of claim 3, said link means moving means being an intermediate part of said link means between the accelerator pedal and the throttle valve and acting when actuated to move the part of said link means connected to the throttle valve in relation to the part of said link means connected to the accelerator pedal.

6. The throttle valve control system of claim 3, said link means having a first part connected with the accelerator pedal and said link means moving means, a second part connected with said link means moving means and the throttle valve, and said link means moving means including a servo-motor acting when actuated to change the effective length of said link means in accordance with movement of said link means first part by the accelerator pedal.

7. A control system comprising a movable input member having a predetermined entire range of movement from an initial position to a maximum limit, a movable output member having a predetermined entire range of movement from an initial position to a maximum limit, a power servo providing a variable length link interconnecting said input member and said output member and having a housing and a power wall dividing said housing into a constant pressure chamber and a variable pressure chamber and means yieldably holding said power wall in a first position, sources of first and second different fluid pressures, fluid pressure control means connected to and initially actuated by movement of said input member within a predetermined lesser range of movement than the entire range of movement of said input member, said predetermined lesser range of movement having a maximum limit thereof coexistent with the maximum limit of the entire range of movement of said input member, means fluid connecting said fluid pressure source and said variable pressure chamber through said fluid pressure control means and connecting one of said fluid pressure sources with said constant pressure chamber, one of said members being connected in force transmitting relation to said servo housing and the other of said members being connected in force transmitting relation to said servo power wall, movement of said input member from the initial position thereof and acting through said servo to directly move said output means from the intial position thereof through a predetermined amount of movement within the respective ranges of movement of said members to a point where movement of said input member initally actuates said fluid pressure control means, said input member then moving within said predetermined lesser range of movement and actuating said fluid pressure control means to adjust fluid pressure from said source into said variable pressure chamber to change the pressure differential acting across said power wall in direct relation to the amount of further input member movement in said predetermined lesser range of input member movement, said pressure differential moving said power wall in said housing from said first position against the force of said yieldably holding means to change the effective length of the variable length link formed by said power servo and therefore further move said output member at a rate of movement different from the rate of further movement of said input member.

8. An engine throttle valve control system comprising:

an accelerator pedal;
a first link movably by said accelerator pedal;
a valve assembly including
a valve actuating rod connected with and movable by said first link,
a valve housing having a fluid pressure input and a fluid pressure output,
and a control valve in said valve housing movably by said valve actuating rod to control the fluid connecting relationship of said input with said output;
a source of fluid pressure and means fluid connecting said source and said valve housing fluid pressure input;
a second link connected with and movable by said first link;
a fluid pressure actuated servomotor having
a housing secured to said second link for movement therewith,
a movable power wall forming with said housing a fluid pressure chamber,
and a spring urging said power wall in one extreme of power wall movement;
a third link secured to said power wall and operatively connected to move an engine throttle valve in accordance with movement of said power wall;
movement of said first link acting through said second link, said housing, said spring, said power wall, and said third link, to move the throttle valve;
said control valve having a first range of valve movement in said valve housing in response to movement of said first link while keeping said fluid pressure output fluid disconnected from said fluid pressure input, said first range of control valve movement corresponding to a major part of the entire range of movement of said accelerator pedal and a minor part of the entire throttle valve opening range of movement;
said control valve having a further range of valve movement in said valve housing in response to further movement of said first link by movement of said accelerator pedal in the remaining minor part of the entire range of movement of said accelerator pedal;
said further movement of said first link also further moving said third link, and said control valve in said further range of valve movement connecting said fluid pressure output to said fluid pressure input in direct proportional fluid pressure connecting relation to the amount of further movement of said first link further movement to generate a proportional servomotor actuating said fluid pressure at said fluid pressure output;
and means fluid connecting said fluid pressure output and said servomotor fluid pressure chamber to energize said servomotor to move said power wall in opposition to said spring to move said third link in a direction relative to said second link to further increase the throttle valve opening within and throughout the remaining major part of the entire throttle valve opening range of movement.

References Cited

UNITED STATES PATENTS

| Re. 18,997 | 11/1933 | Hallett | 188—152.44 |
| 1,878,786 | 9/1932 | Lombard | 188—152.44 |
| 3,104,590 | 9/1963 | Kellogg | 251—25 |
| 3,180,232 | 4/1965 | Ayers | 251—25 |
| 3,237,527 | 3/1966 | Martin | 91—377 |

FOREIGN PATENTS 471,344   1/1929   Germany.

M. CARY NELSON, *Primary Examiner.*

A. ROSENTHAL, *Examiner.*

J. W. KNIGHT, *Assistant Examiner.*

UNITED STATES PATENT OFFICE
CERTIFICATE OF CORRECTION

Patent No. 3,352,315　　　　　　　　　　　　November 14, 1967

George E. Kellogg

It is hereby certified that error appears in the above numbered patent requiring correction and that the said Letters Patent should read as corrected below.

Column 1, line 2, for "nad" read -- and --; column 2, line 13, for "sldiable" read -- slidable --; column 5, line 19, for "source" read -- sources --; line 30, for "means" read -- member --; lines 37 and 38, for "pressure" read -- pressures --; line 38, for "source" read -- sources --; line 54, for "movably" read -- movable --; column 6, line 40, strike out "said", first occurrence.

Signed and sealed this 10th day of December 1968.

(SEAL)
Attest:

Edward M. Fletcher, Jr.　　　　　　　　　　EDWARD J. BRENNER
Attesting Officer　　　　　　　　　　　　　Commissioner of Patents